United States Patent [19]
Luley et al.

[11] Patent Number: 6,150,620
[45] Date of Patent: Nov. 21, 2000

[54] STEERING COLUMN SWITCH FOR A MOTOR VEHICLE

[75] Inventors: Reiner Luley, Mainz; Markus Leuschner, Bretzenheim; Gerd Rudolph, Aspisheim, all of Germany

[73] Assignee: Eaton Corporation, Cleveland, Ohio

[21] Appl. No.: 09/230,738

[22] PCT Filed: Jul. 26, 1997

[86] PCT No.: PCT/DE97/01605

§ 371 Date: Dec. 6, 1999

§ 102(e) Date: Dec. 6, 1999

[87] PCT Pub. No.: WO98/05533

PCT Pub. Date: Feb. 12, 1998

[30] Foreign Application Priority Data

Aug. 2, 1996 [DE] Germany ............................ 196 31 208

[51] Int. Cl.[7] .................................................. H01H 9/00
[52] U.S. Cl. ..................................... 200/61.27; 200/61.54
[58] Field of Search ............................ 200/4, 17 R, 61.27, 200/61.54, 11 R, 11 A

[56] References Cited

U.S. PATENT DOCUMENTS

| | | | |
|---|---|---|---|
| 5,272,290 | 12/1993 | Suzuki et al. ............................... | 200/4 |
| 5,629,505 | 5/1997 | Cryer ..................................... | 200/61.54 |
| 5,780,794 | 7/1998 | Uchiyama et al. ................... | 200/61.54 |
| 5,923,006 | 7/1999 | Nakamura ............................... | 200/5 B |
| 5,939,683 | 8/1999 | Hoskins et al. ......................... | 200/5 R |
| 6,025,564 | 2/2000 | Verduci et al. ....................... | 200/61.27 |

*Primary Examiner*—Michael Friedhofer
*Attorney, Agent, or Firm*—Roger A. Johnston

[57] ABSTRACT

An automobile steering column switch is provided with a turn signal switch with a selector lever (1) into which a rotary light switch (23) for parking and driving lights is integrated. In order to be able to use the rotary light switch (23) for switching the front and/or rear fog lights on an automobile on and off, the rotary light switch (23) is associated with at least one switching position (13) for front and/or rear fog lights. In order to move the rotary light switch (23) into the switching position "front fog light" and/or "rear fog light" (13), preferably a greater force is required than for moving said switch into the switching positions "off" (10), "parking light" (11) and "driving light" (12).

17 Claims, 7 Drawing Sheets

STEERING COLUMN SWITCH FOR A MOTOR VEHICLE

CROSS-REFERENCE TO RELATED APPLICATION

None

STATEMENT REGARDING FEDERALLY SPONSORED RESEARCH OR DEVELOPMENT

Not Applicable

MICROFICHE APPENDIX

Not Applicable

BACKGROUND OF THE INVENTION

The invention herein relates to an automobile steering column switch comprising a turn signal switch with a selector lever with integrated rotary light switch for parking and driving lights.

Generally, steering column switches are mounted to the steering column of the automobile in such a manner that the steering column switch is mounted to the steering column tube and extends in radial direction from the steering column. This arrangement prevents the relative movement between the steering column switch and the steering wheel when the steering wheel, and hence the steering column guided in the steering column tube, are moved. As a rule, the steering column switch accommodates a turn signal switch to indicate driving direction and a light switch for the parking and driving lights of the vehicle; frequently, this light switch is configured as rotary light switch and built into the switch lever of the turn signal switch.

In most cases the instrument panel or the center console of an automobile hold additional switches for activating front and rear fog lights. Therefore, the switching functions of automobile fog lights are separate from the switching functions "off," "parking light" and "driving light" of the light switch for the headlamps. The disadvantage of this arrangement is that the front fog light and/or the rear fog light switches are located relatively far from the control area of the driver of the automobile. In addition, these front and/or rear fog light switches require separate complex and expensive configuring and wiring. Consequently, it is more desirable to locate the front and/or rear fog light switches within the driver's closer operating range.

The problem to be solved by the invention herein is to provide a steering column switch of the above-described type, comprising a rotary light switch permitting the additional activation and deactivation of front and/or rear fog lights on an automobile, whereby the steering column switch is convenient to operate and may be manufactured in an easy and cost-effective manner.

SUMMARY OF THE INVENTION

In accordance with the invention herein this problem has been solved in that the rotary light switch comprises at least on switching position for front and/or rear fog lights.

In addition, to the functions "off," "parking light" and "driving light," the present invention incorporates functions for front and/or rear fog lights in the rotary light switch. This eliminates the standard, spatially separate, arrangement of all control elements for front and/or rear fog lights. The steering column switch can always be comfortably reached and used by the driver of the automobile, thus permitting the more convenient activation of the switching functions for front and/or rear fog lights. Furthermore, the steering column switch of the invention herein does not require a particularly greater design effort in order to accommodate the front and/or rear fog light switches because the associated functional elements are housed entirely in the rotary light switch. Consequently, the steering column switch, including the additional functions of the front and/or rear fog light switches, may be manufactured in an easy and cost-effective manner. A particular advantage, from the viewpoint of manufacturing technology is the configuration of the rotary light switch and the front and/or rear fog light switches as one assembly.

In accordance with one embodiment of the invention herein the switching positions "off," "parking light" and "driving light" are followed in activation direction of the rotary light switch by a switching position for front and/or rear fog lights. Consequently, the switching positions can be activated sequentially as follows: "off," "parking light," "driving light" and "front fog light" and/or "rear fog light." Inasmuch as the functions "front fog light" and/or "rear fog light" are the least frequently used, i.e., only under conditions of poor visibility on account of fog, the switching position for the latter is provided at the end of the switching cycle of the rotary light switch, thereby always assuring that the front and/or rear fog lights arc switched off when the "driving light" is switched off.

In accordance with a modification of the invention herein it is particularly advantageous when greater force is required for moving the rotary light switch into the switching positions "front fog light" and/or "rear fog light" than for the switching positions "off," "parking light" and "driving light." This allows the driver to actually feel or tactility discern the difference between the activation of the front and/or rear fog lights and the activation of the headlamps. By requiring the use of greater force to switch into the positions "front fog light" and/or "rear fog light" such that the inadvertent deactivation of the vehicle's front and/or rear fog lights is prevented. Once fog conditions no longer exist, the rotary light switch is rotated into the switching positions "driving light," "parking light" or "off," thereby automatically switching off the "front fog light" and/or "rear fog light." As a result, the continued inadvertent operation of front and/or rear fog lights will be prevented.

In accordance with another modification of the invention herein the interior of the selector lever housing contains a locking element braced against said housing, which said locking element can be brought into locking engagement with a stop cam on the inside of the rotary handle of the rotary light switch. As a result, the switching positions "off," "parking light," "driving light" and "front fog light" and/or "rear fog light" are located such that they are offset with respect to each other. It is useful if the locking element is spring-biased as it rests against the housing interior and projects through a passage opening in the housing. A compression spring provides the pressure required for pushing the locking element against the stop cam, whereby this pressure is transmitted through the locking element projecting through the passage opening.

In order to be able to switch the positions "off," "parking light," "driving light" and "front fog light" and/or "rear fog light" in the disclosed sequence, the stop cam preferably forms a stop cam path made up of one or more adjacent stop cam parts housed in the rotary light switch. In so doing, the two first stop cam parts are associated with the switching positions "parking light" and "driving light," while the subsequent stop cam part is associated with the switching positions "front fog light" and/or "rear fog light."

Furthermore, the first two stop cam parts have substantially the form of an isosceles triangle designed for the switching positions "parking light" and "driving light." If the driver of the vehicle uses normal force when rotating the rotary handle of the rotary light switch, the stop element overcomes the stop cam parts having the form of an isosceles triangle and activates the associated switching positions. As opposed to this, the stop cam part for the switching position "front fog light" and/or "rear fog light" has the shape of an unequalsided triangle, whereby its front side is steeper than its rear side. Consequently, the stop element passes the steeper side of the stop cam having the shape of an unequalsided triangle more slowly, so that the rotary motion of the rotary light switch requires a greater force than is necessary for the stop cam parts having the shape of an isosceles triangle for the switching positions "parking light" and "driving light." Due to this, the driver of the vehicle can recognize based on position when he switches to "front fog light" and/or "rear fog light." At the same time this lets him know if he inadvertently switched positions.

An alternative embodiment of the present invention herein allows the driver to hear a locking mechanism by pulling or pushing the rotary handle of the rotary light switch before he moves the rotary light switch into the switching positions "front fog light" and/or "rear fog light." In this case the rotary handle may be moved into the switching position "front fog light" and/or "rear fog light" only after the locking mechanism has been released.

For more convenient operation, the rotary light switch is located on the outer end of the selector lever of the turn signal switch. Therefore, the rotary light switch is more easily accessible and within closer reach for the driver of the vehicle.

In order to limit the rotary motion of the rotary handle of the rotary light switch in a simple manner the housing of the selector lever preferably has a thicker switch segment and the internal peripheral wall of the rotary handle has two stops which can be brought into engagement with the thicker segment of the switch part. These stops are located diametrically opposed on the internal peripheral wall of the rotary handle.

It is useful if the rotary handle of the rotary light switch has at least one activation element configured to make operation more convenient.

Preferably, a push-button switch for another switching function is set in the free end of the rotary light switch. This push-button switch may be used, for example, for switching the high beams on and off.

BRIEF DESCRIPTION OF THE DRAWINGS

The invention will be explained in detail hereinafter with reference to one example of embodiment and related drawings. They show.

DETAILED DESCRIPTION

Figure 1:
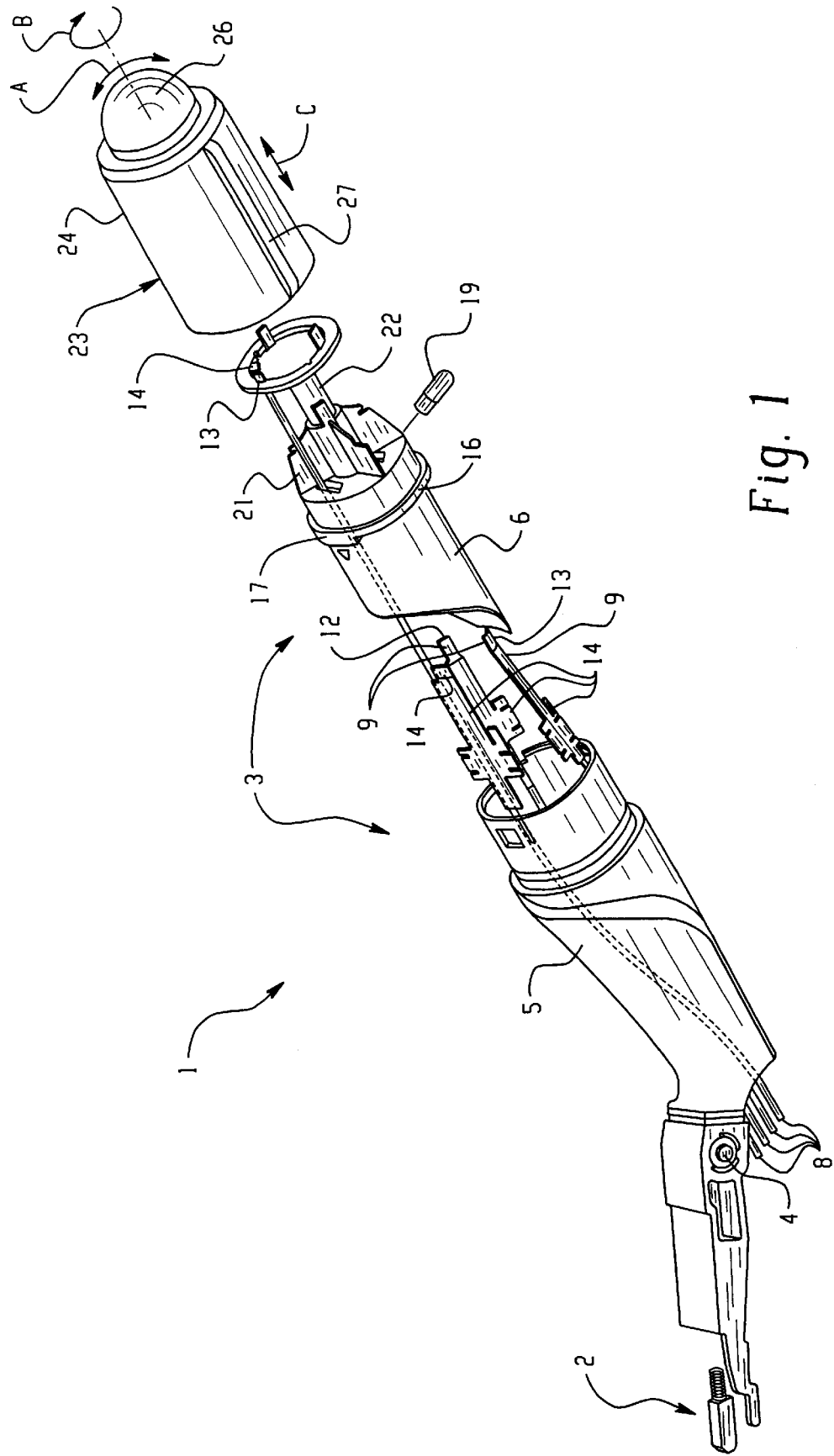
FIG. 1 an exploded view of the selector lever of the turn signal switch with integrated rotary light switch of the inventive steering column switch.
Figure 2:
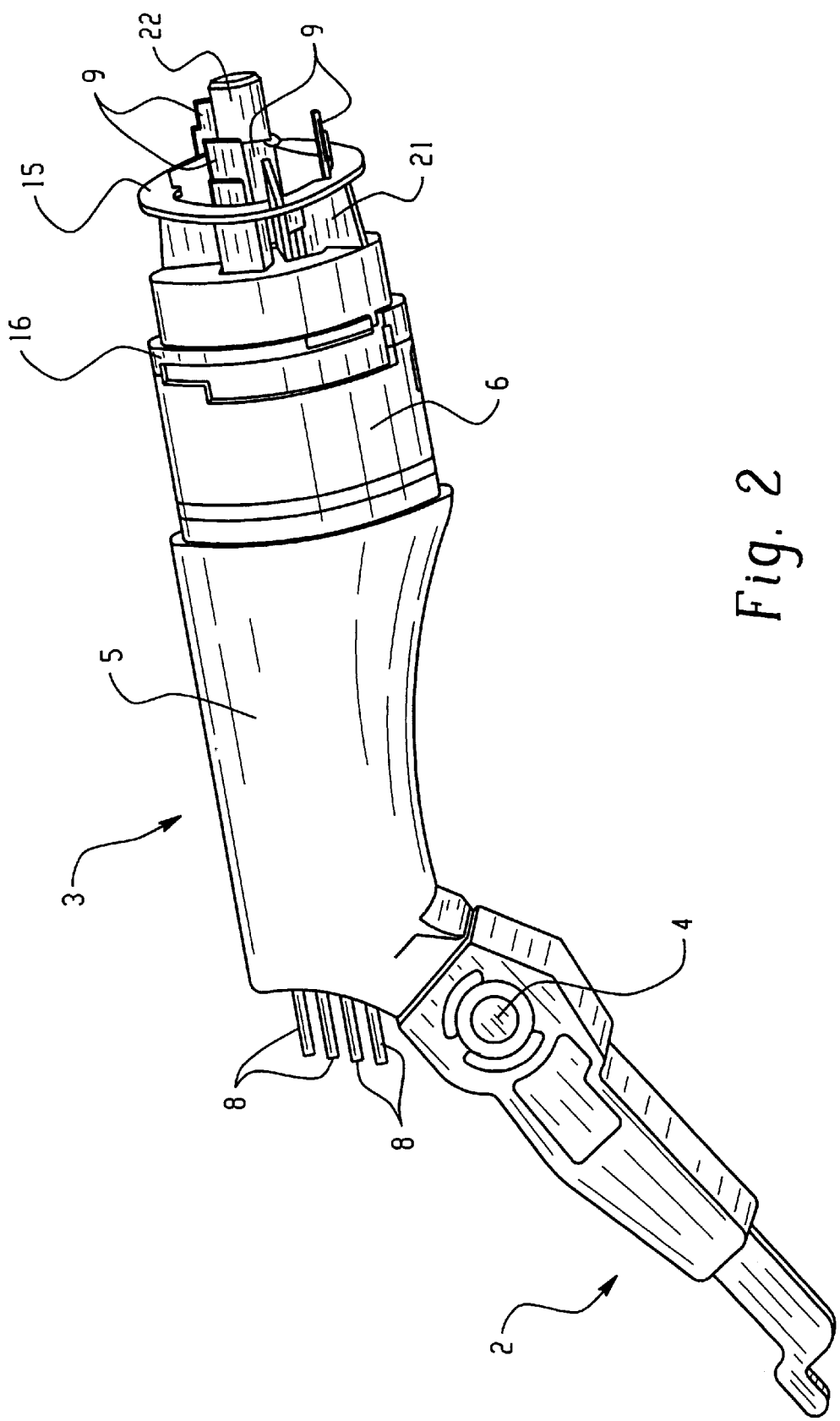
FIG. 2 a perspective view of part of the selector lever in accordance with FIG. 1.
Figure 3:
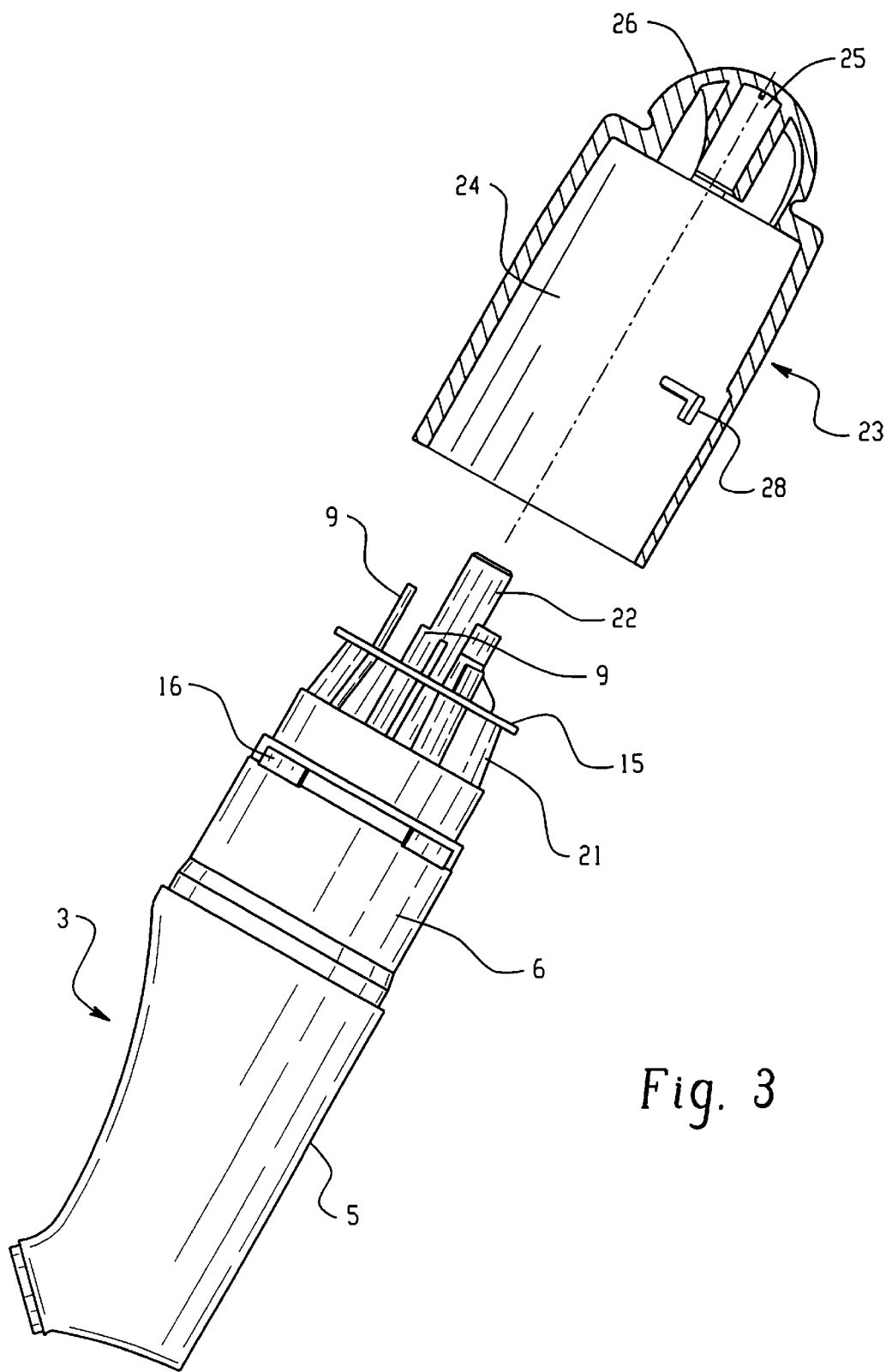
FIG. 3 an exploded view of part of the selector lever, with the rotary handle of the rotary light switch in section, in a side elevation in accordance with FIG. 1.

A selector lever indicated generally at 1 of a not illustrated turn signal switch being an integral part of an automobile steering column switch is brought into position over a bearing 4 by pivotal motion in the direction of arrow A on the turn signal switch. The part of selector lever 1 extending into the turn signal switch receives on its end a compression-spring-biased stop element indicated generally at 2 cooperating with a not illustrated stop cam in order to set the switching positions of selector lever 1. Selector lever 1 has a housing indicated generally at 3, which substantially consists of a receiving element 5 and an attachment element 6 attached thereto. Inside receiving element 6 and attachment element 6 is a set of cables indicated generally at 7 with switching contacts, whereby individual cables 8 on the rear end of the receiving element 5 are arranged in such a manner that they are fed to an electrical control unit of the automobile.

The front ends of cables 8 are each provided with switching contacts 9, i.e., one switching contact 10 for the switching position "off," one switching contact 11 for the switching position "parking light," one switching contact 12 for the switching position "driving light" and one switching contact for the switching position "front fog light" and/or "rear fog light" of rotary light switch indicated generally at 23 located at the end of a selector lever 1. Switching contacts 10 through 13 are provided with cable lugs 14. Switching contacts 10 through 13 are set in position by means of a switching contact ring 15, which is affixed to attachment element 6 of housing 3.

Figure 4:
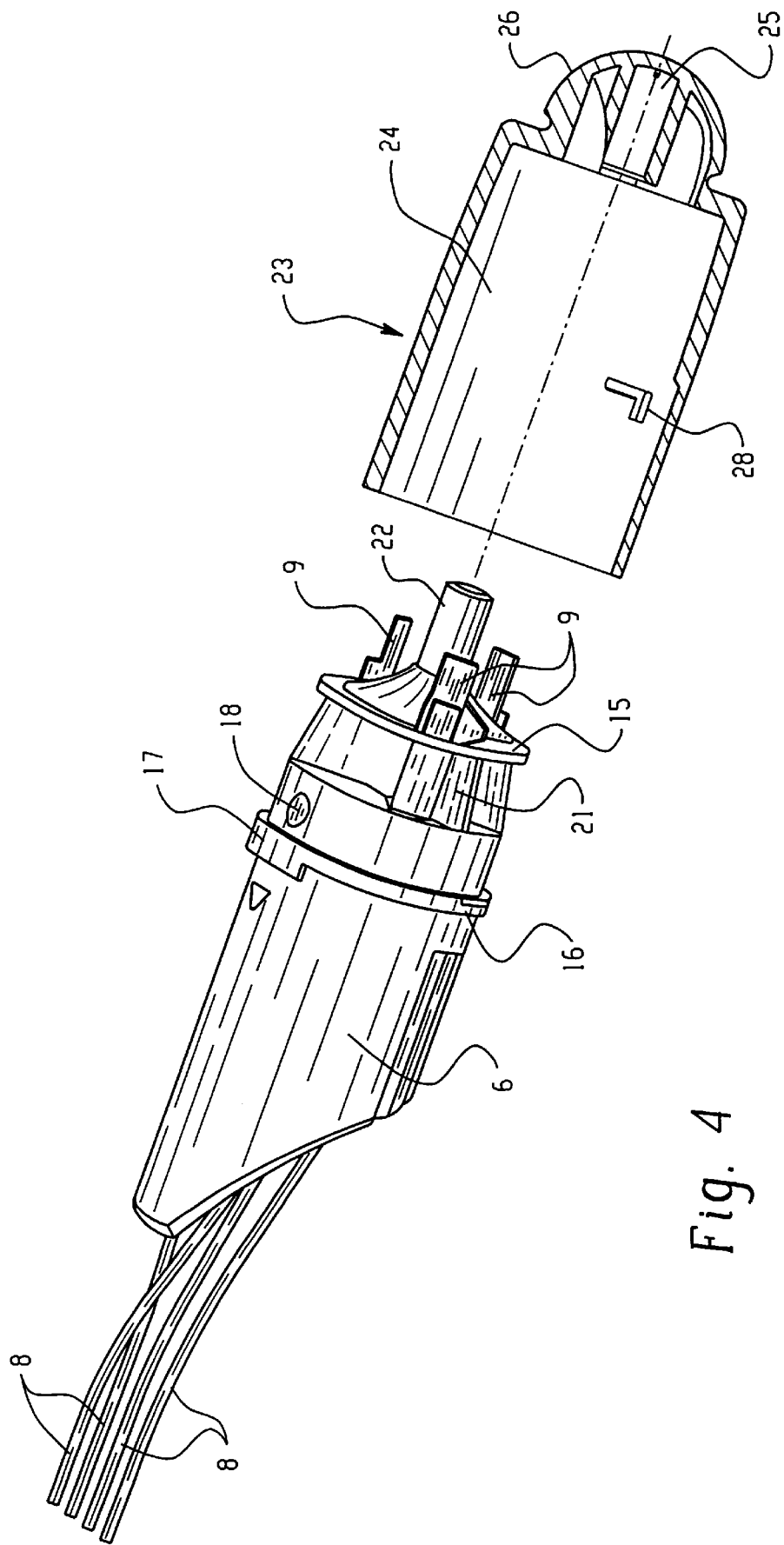
FIG. 4 a perspective view in accordance with FIG. 3.
Figure 5:
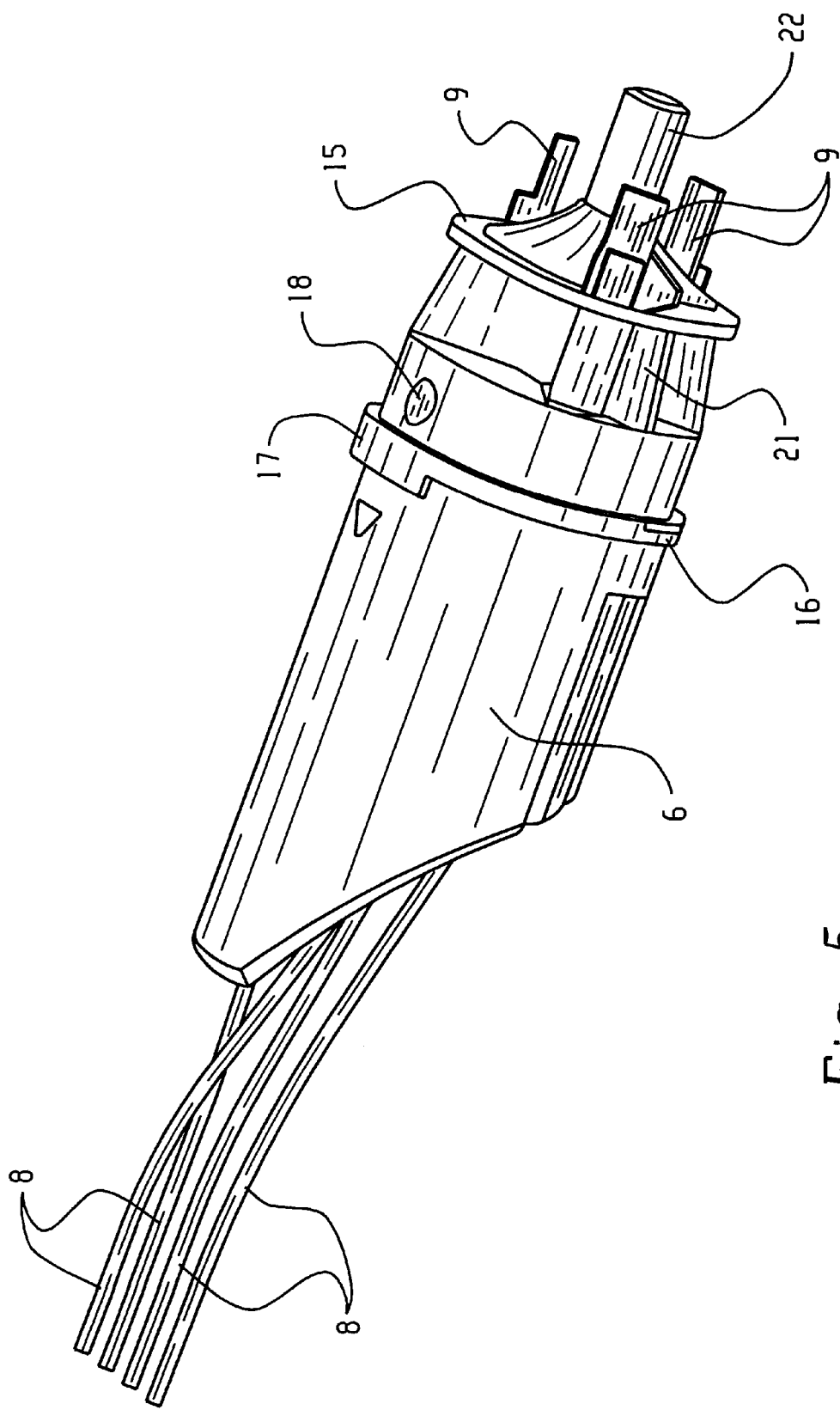
FIG. 5 a perspective view of another part of the selector lever in accordance with FIG. 1 through 4.
Figure 6:
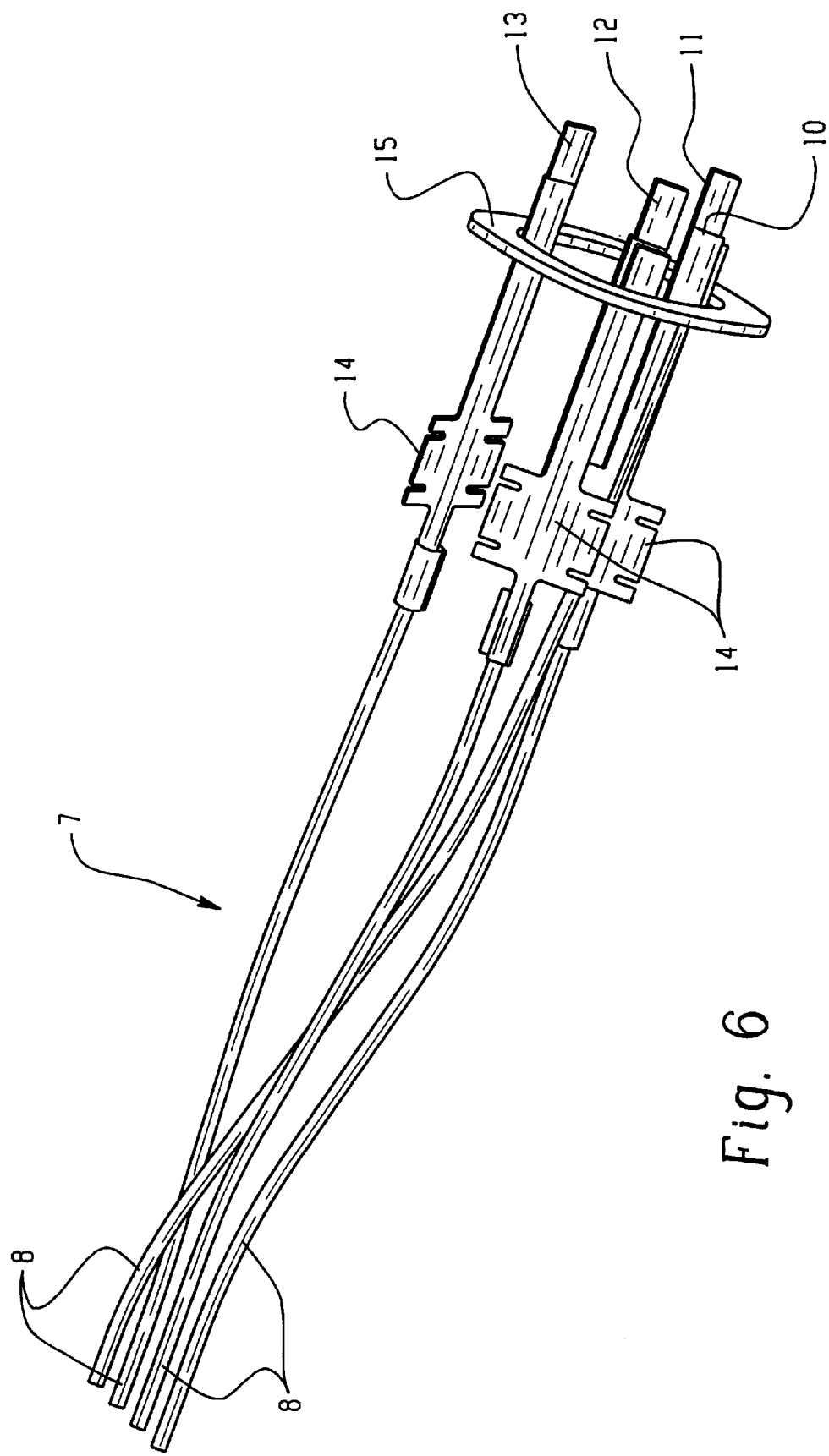
FIG. 6 a perspective view of the electrical components of the selector lever.
Figure 7:
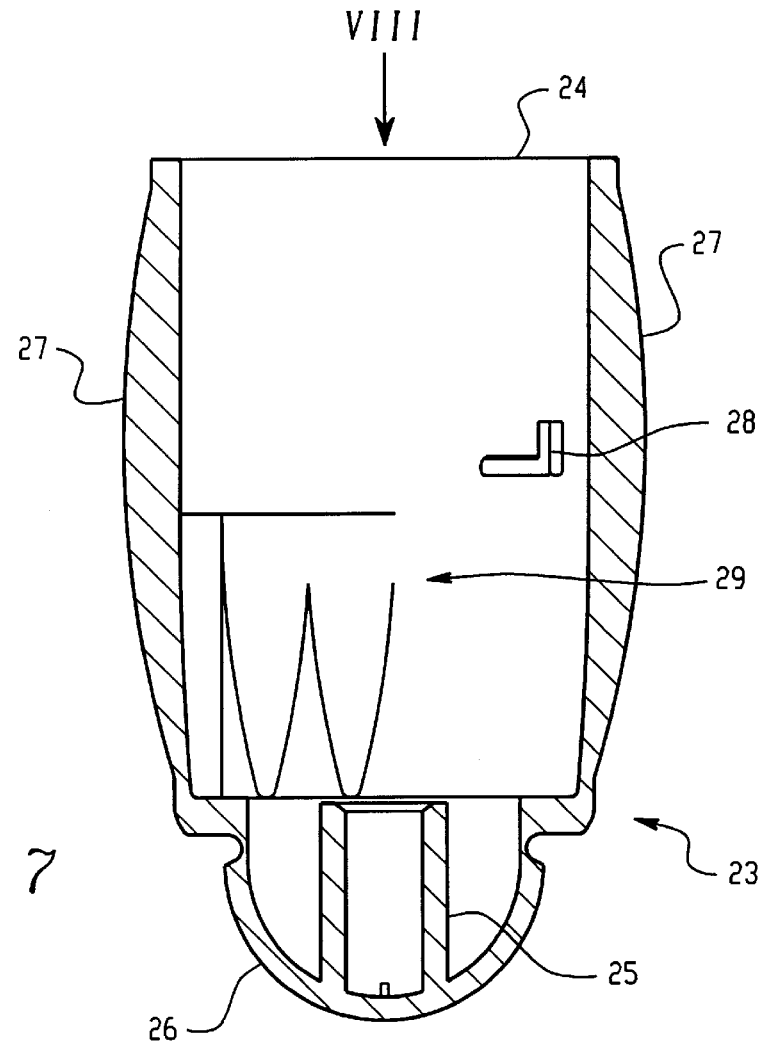
FIG. 7 a sectional view in longitudinal direction of the rotary handle of the rotary light switch in accordance with FIGS. 1, 3 and 4.

Attachment element 6 is provided with a peripheral circular collar part 16, which, on part of its periphery, has a thicker segment 17. In addition, in accordance with FIG. 4 and 5, attachment element 6 is provided with a passage opening 18 for a stop element 19 in abutment with the interior of attachment element 6. Said stop element 19 has on its abutment end a compression spring 20 pushing attachment element 6 through passage opening 18 toward the outside. In addition, attachment element 6 comprises an adjoined receiving piece 21 which receives spring-biased push rod 22 of a push-button switch 26 integrated in rotary light switch 23, switch 26 being used for switching off the high beams.

With selector lever 1 mounted, rotary light switch 23 is placed on attachment element 6 of housing 3 and covers the circular collar part 16. Rotary light switch 23 comprises a rotary handle 24, which can be rotated in the direction of arrow B in accordance with FIG. 1. A push rod 22 comes into engagement with a receiving part 25 of rotary handle 24. Furthermore, rotary handle 24 is provided on its outside with diametrically opposed activation elements 27 designed as operating aids to facilitate gripping.

Adjoining the internal peripheral wall of rotary handle 24 are two diametrically opposed abutments 28. Abutments 28 are designed to abut against the edges of the thicker segment 17 of collar part 16 on attachment element 6 during the rotary motion of rotary handle 24, thereby limiting the rotary motion of rotary handle 24.

Figure 8:
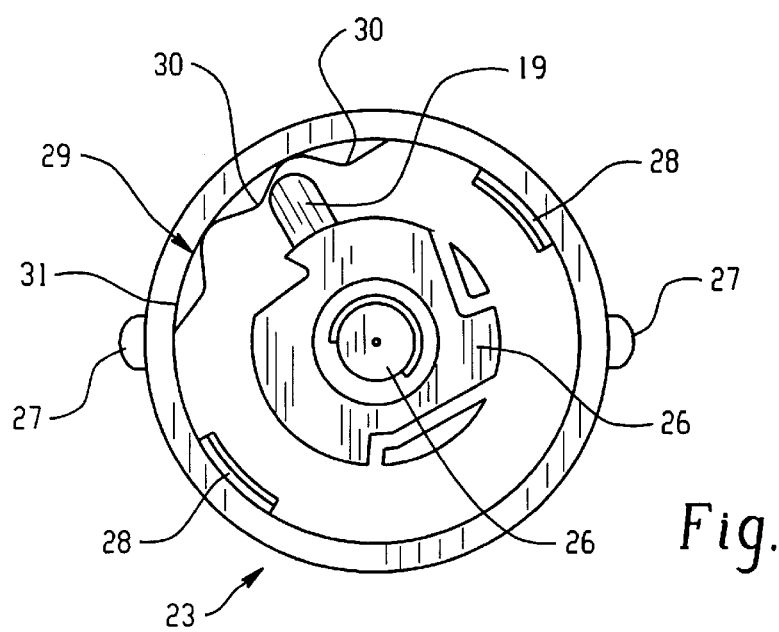
FIG. 8 a view of the rotary handle in the direction of arrow VIII in accordance with FIG. 7.

A stop cam 29 is provided in an area between the two abutments 28, also on the internal peripheral wall of rotary handle 24. Stop element 19 biased by compression spring 20 and resting against the inside of attachment element 6 is guided on the path of stop cam 29 as shown in FIG. 8. Each of the recesses in stop cam 29 is provided for one of the switching positions on rotary light switch 23, i.e., 10 for "off," 11 for "parking light," 12 for "driving light" and 13 for "front fog light" and/or "rear fog light." Therefore, the recesses and elevations of stop cam 29 are used to realize the respective switching positions, whereby the substantially triangular configuration of the stop cam path produces a switch activation which can be felt by the driver. In order to maintain the switching positions "parking light" 11 and "driving light" 12, stop cam parts 30 are substantially given the shape of an isosceles triangle, so that these switching positions can be achieved by normal use of force when rotating rotary light switch 23. As opposed to this, stop cam part 31 located on the left side is configured as unequalsided triangle, whereby its front side is steeper than its rear side. As a result of this, more force is required for activating rotary light switch 23 when the front and/or rear fog lights are to be switched on, because spring-biased stop element 19 first must overcome the steeper side of stop cam part 31.

What is claimed is:

1. An automobile steering column switch comprising a turn signal switch with a selector lever (1) with a built-in rotary light switch (23) having a plurality of rotary switching positions for parking and driving lights, characterized in that the rotary light switch (23) has at least one of said switching position (13) for front and rear fog lights and the switching position for "off" (10), "parking light (11) and driving light (12) are followed by the switching position (13) for at least one of "front fog light" and "rear fog light" in activation direction of the rotary light switch (23)."

2. Steering column switch in accordance with claim 1, characterized in that, in order to move the rotary light switch (23) into the switching position "front fog light" and "rear fog light" (13), a greater force is required than for the switching positions "off" (10), "parking light" (11) and "driving light " (12), respectively.

3. Steering column switch in accordance with claim 1, characterized in that a housing (3) of the selector lever (1) includes a stop element (19) abutting against said housing, whereby said stop element can be brought into locking engagement with a stop cam (29) provided on the inside periphery of a rotary handle (24) of the rotary light switch (23).

4. Steering column switch in accordance with claim 3, characterized in that the stop element (19), biased by a compression spring (20), is pushed against the housing (3) and extends through a passage opening (18) provided in the housing (3).

5. Steering column switch in accordance with claim 3, characterized in that the stop cam (29) in the rotary light switch (23) forms a stop cam path made up of several adjacent stop cam parts (30, 31).

6. Steering column switch in accordance with claim 5, characterized in that the two of said several stop cam parts (30) are operative for defining the switching positions "parking light" (11) and "driving light" (12).

7. Steering column switch in accordance with claim 5, characterized in that the stop cam parts (30) substantially are each shaped as an isosceles triangle.

8. Steering column switch in accordance with claim 5, characterized in that another of said several cam parts (31) defines one of the switching positions "front fog light" and "rear fog light" (13).

9. Steering column switch in accordance with claim 8, characterized in that said another stop cam part (31) has the shape of an unequalsided triangle, whereby one side is steeper than a second side.

10. Steering column switch in accordance with claim 8, characterized in that the rotary light switch (23) is located on an end of the selector lever (1) of the turn signal switch.

11. Steering column switch in accordance with claim 1, characterized in that, before moving the rotary light switch (23) into one of the switching position "front fog light" and "rear fog light" (13), a locking mechanism must be released by pulling or pushing the rotary handle (24) of the rotary light switch (23).

12. Steering column switch in accordance with claim 1, characterized in that a collar part (16) with a relatively thick segment (17) is provided on the housing (3) of the selector lever (1), and that an interior peripheral wall of the rotary handle (24) has abutments (28) which can be brought into engagement with the relatively thick segment (17) of the collar part (16).

13. Steering column switch in accordance with claim 12, characterized in that the abutments (28) are located diametrically opposed said interior peripheral wall of the rotary handle (24).

14. Steering column switch in accordance with claim 1, characterized in that the rotary handle (24) of the rotary light switch (23) has at least one activation element (27) designed to serve as operating aid.

15. Steering column switch in accordance with claim 1, characterized in that a push-button switch (26) for an additional switching function is set in an end of the rotary light switch (23).

16. An automobile steering column switch assembly comprising:
(a) a turn signal switch mounted on the steering column and having a selector lever extending outwardly from the steering column; and
(b) a rotary light switch built-in said selector lever, said rotary light switch having a user actuated member with a plurality of rotary switching positions for respectively parking and driving lights and respectively for at least one of front and rear fog lights, wherein a greater force is required for the user to move said member to the respective position for at least one of said fog lights then for either of said respective positions for parking and driving lights.

17. The switch assembly defined in claim 16, wherein said plurality of rotary positions includes sequentially an "off" position, a parking light position, a driving light position and at least one of a front and rear fog light position.

* * * * *